United States Patent
Kryeziu

(10) Patent No.: US 7,400,764 B2
(45) Date of Patent: Jul. 15, 2008

(54) COMPRESSION AND DECOMPRESSION OF MEDIA DATA

(75) Inventor: Arben Kryeziu, Wailuku, HI (US)

(73) Assignee: Maui X-Stream, Inc., Lahaina, HI (US)

( * ) Notice: Subject to any disclaimer, the term of this patent is extended or adjusted under 35 U.S.C. 154(b) by 695 days.

(21) Appl. No.: 11/121,748

(22) Filed: May 4, 2005

(65) Prior Publication Data

US 2006/0251321 A1 Nov. 9, 2006

(51) Int. Cl.
*G06K 9/00* (2006.01)

(52) U.S. Cl. .......................... 382/166; 382/162; 382/232

(58) Field of Classification Search ................. 382/166, 382/162, 165, 176, 232; 375/240.25, 240.24, 375/E7.029, E7.076; 348/E13.008; 250/208.1, 250/559.4; 358/1.9; 708/520

See application file for complete search history.

(56) References Cited

U.S. PATENT DOCUMENTS

| | | | |
|---|---|---|---|
| 4,903,317 A | 2/1990 | Nishihara et al. | 382/244 |
| 5,095,374 A | 3/1992 | Klein et al. | 382/246 |
| 5,408,542 A | 4/1995 | Callahan | 382/244 |
| 5,790,705 A | 8/1998 | Anderson et al. | 382/244 |
| 5,835,034 A | 11/1998 | Seroussi et al. | 341/65 |
| 5,884,269 A | 3/1999 | Cellier et al. | 704/501 |
| 6,021,224 A | 2/2000 | Castelli et al. | 382/232 |
| 6,154,493 A | 11/2000 | Acharya et al. | 375/240.19 |
| 6,370,197 B1 | 4/2002 | Clark et al. | 375/240.19 |
| 6,603,814 B2 | 8/2003 | Clark et al. | 375/240.19 |
| 6,608,940 B1 | 8/2003 | Sliva | 382/244 |
| 6,628,717 B1 | 9/2003 | Jeong et al. | 375/240.19 |
| 6,720,894 B2 | 4/2004 | Wilson et al. | 341/106 |
| 7,003,542 B2 * | 2/2006 | Devir | 708/520 |

FOREIGN PATENT DOCUMENTS

| | | |
|---|---|---|
| FR | 2849329 | 6/2004 |
| WO | WO-03021969 A2 | 3/2003 |

OTHER PUBLICATIONS

Schaar, M. V., et al., "A Hybrid Temporal-SNR Fine-Granular Scalability for Internet Video", *IEEE Transactions On Circuits And Systems for Video Technology*, 11 (3), (Mar. 2001).

Sikora, T., "The MPEG-4 Video Standard Verification Model", *IEEE Transactions On Circuits And Systems for Video Systems for Video Technology*, 7 (1), (Feb. 1997),23-29.

* cited by examiner

*Primary Examiner*—Anh Hong Do
(74) *Attorney, Agent, or Firm*—Schwegman, Lundberg & Woessner, P.A.

(57) ABSTRACT

A decompressed version of a compressed wave of media data is compared to an original version of that media data before it was compressed. A matrix correction value and a color matrix layout for the decompressed version are produced. Entries for symbols and their original positions within the original version of the wave are recorded within a pattern matrix. The pattern matrix, the matrix correction value, the color matrix layout, and the compressed version are streamed to a recipient for subsequent decompression.

27 Claims, 5 Drawing Sheets

COMPRESSION AND DECOMPRESSION OF MEDIA DATA

FIELD

The invention relates generally to data processing and more specifically to compression and decompression of media data.

BACKGROUND

Generally compression techniques take one of two popular approaches. The first approach is referred to as lossless compression. With lossless compression every bit in the original data file that is compressed is recovered when it is subsequently decompressed. Because every bit is recovered and restored with lossless compression, the technique does not substantially reduce the size of the original data file that is compressed. Therefore, lossless compression is a popular technique for compressing text, word processing documents, and spreadsheets where loss of any data can be catastrophic.

The second approach is referred to as lossy compression. With lossy compression a certain amount of information or bits are generally not recoverable when an original data file that is compressed is subsequently decompressed. Generally, a user may not detect the information that was lost with lossy compression because lossy compression is generally used with large data files, such as audio and video and occasional bit losses may go undetected by the user. The benefit of lossy compression is that a more substantial reduction in the size of the original data file can be achieved in the compressed version of the original data file.

However, users are becoming more discerning and are demanding better quality media data (e.g., video, image, audio, graphics, etc.). Therefore, what use to be considered acceptable data loss with lossy compression is rapidly becoming unacceptable to users with higher-speed Internet connections, higher quality processing devices having more memory, and higher quality displays.

Further, lossless compression is not an acceptable alternative for media data compression because it cannot achieve acceptable reductions in the size of media streams that were compressed with a lossless technique.

Therefore, an alternative approach, which can retain the quality that is associated with lossless compression and which can simultaneously achieve the size reduction that is associated with lossy compression, is needed.

SUMMARY

In various embodiments, techniques are presented for compression and decompressing media data. More specifically, and in an embodiment, an original version of media data is compressed. Next, the compressed version is decompressed. The decompressed version is compared against the original version and a matrix correction value is generated for restoring the original color values of the compressed version when it is subsequently decompressed. A color matrix layout is also produced for restoring the original color layout for the subsequently decompressed version. Finally, one or more entries into a pattern matrix are generated for restoring symbols in the subsequent decompressed version back to their original locations as noted in the original version before it was decompressed.

DETAILED DESCRIPTION

Figure 1:
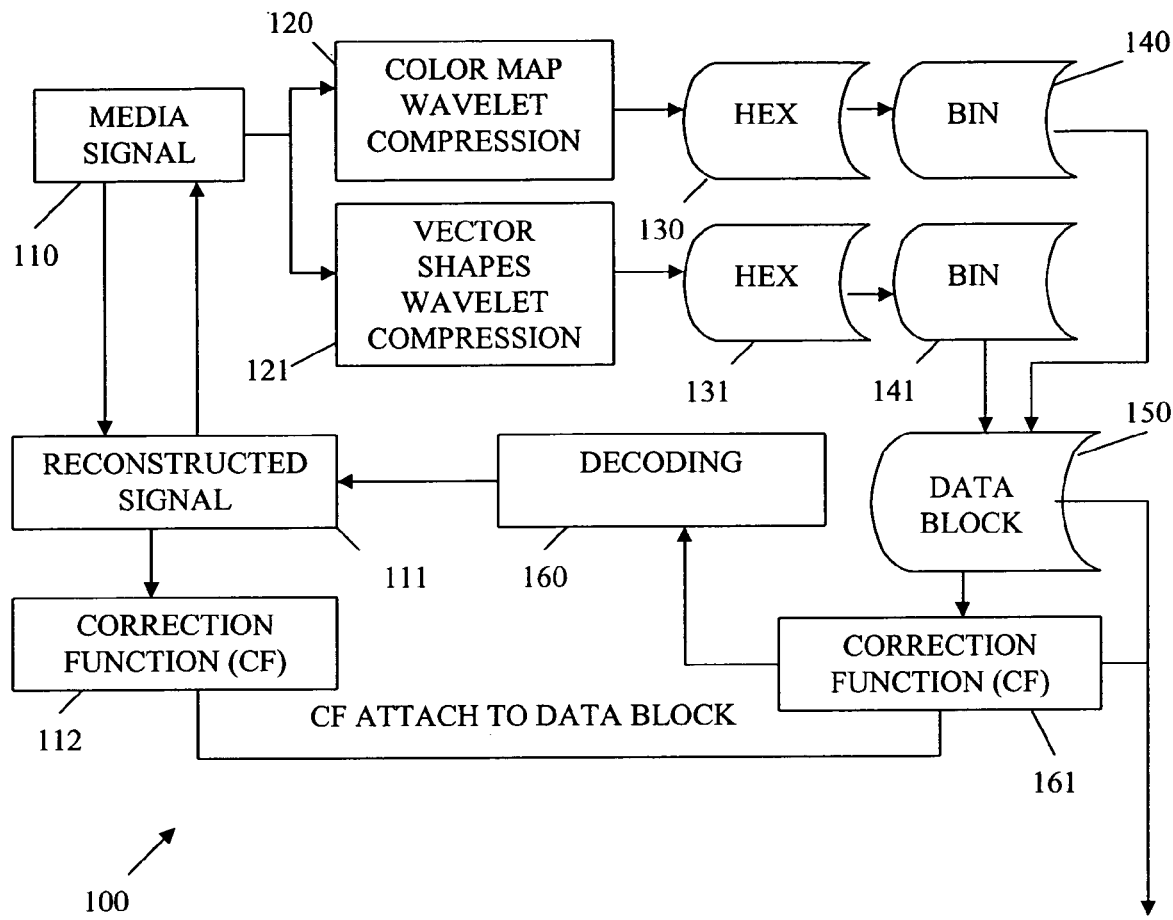
FIG. 1 is a diagram of an example overview of processing associated with compressing media data, according to an example embodiment.

FIG. 1 is a diagram of an example overview of processing 100 associated with compressing media data, according to an example embodiment. The processing 100 is implemented in a machine-accessible and readable medium and is optionally accessible over a network. The network may be wired, wireless, or a combination of wired and wireless.

Embodiments of this invention utilize a dual wavelet compression technique on media streams (e.g., video, audio, graphics, images, etc.). The dual compression is performed on each media frame. Previous techniques have relied solely on a single wavelet compression technique. Thus, these previous techniques require a heavy overhead of logistical operations to track changes associated with a color map of the media frames. As will be demonstrated herein and below, a dual wavelet technique results in significantly fewer operations that are needed during decompression, such that decoding is more process efficient.

It will also be demonstrated in the description that follows that compressed media streams may be decompressed back to their original signal with substantially no loss of information. Such techniques have previously been available only with lossless compression, but lossless compression has not heretofore been practical with respect to media data. In fact, lossless compression has largely been reserved for word processing files. Previous approaches have compressed media data with lossy compression where loss of signal information associated with the original media stream is expected and tolerated to achieve greater reductions in size within a compressed media stream and thus better network and processing throughput for delivery and decompression.

The processing of FIG. 1 can be segmented into 4 unique processing subcomponents. In the first processing subcomponent, represented by blocks 110, 111, and 112, error correction is generated for a compressed media stream. In a second subcomponent represented by the blocks 120 and 121, sequential frames of the media stream is compressed according to color similarities within each frame and according to primitive shapes represented within each frame. With a third processing subcomponent represented by the blocks 130 and 131 the compressed data is represented as hexadecimal strings. In a fourth processing subcomponent represented by the blocks 140 and 141 entropy encoding is achieved by reducing the hexadecimal strings to binary strings. The overall operation will now be discussed in greater detail.

Initially, a media signal or stream is acquired at 110; that signal is split into two separate signals for purposes of undergoing a dual wavelet compression. The first compression is achieved for color variations represented in the media stream. Thus, at 120, a color map wavelet compression technique is performed to reduce the media stream for color features. The second compression is achieved for shape variation. Accordingly, at 121, a vector shape wavelet compression is performed against the media stream for primitive shapes appearing in the media stream.

In an embodiment, the color wavelet compression may be implemented as follows against the original media stream. For the color wavelet compression: $[N-\frac{1}{2}*QF, (N+\frac{1}{2})*QF]$ wherein N represents a unique color pattern or value within the media stream and where QF represents a value for a prior processed frame, such that inter-frame dependencies are account for. The shape compression may be implemented as: $[N*QF, (N+1)*QF]$ where N represents a unique primitive symbol within the media stream and where QF represents a value for a prior processed frame. These calculations apply where N>0 and where $[(N-1)*QF, N*QF]$.

Next, the dual compressed media streams are passed to hexadecimal encoding techniques at 131 and 132, where the compressions are represented as two hexadecimal strings. The hexadecimal strings are further reduced through entropy encoding at 140 and 141, where each hexadecimal string becomes a binary string, each binary value in the color compression string corresponding to a unique color and each binary value in the shape compression corresponding to a unique primitive shape.

The two binary compressed strings are combined at 150 to form the initial compressed media stream as a data block. An example technique for combining the two binary compressed strings may be represented as: $E(q,x)|p_{i,j}-Q(_{i,j})|^x)^{1/x}$, where x corresponds to the dimension of a pixel matrix represented with the binary string, such as 4×4, 8×8, 16×16, etc. and x is greater than 0; q is an integrator that begins at 1 and continues to x or begins at 0 and continues to x−1; p is a function that supplies types of shading or variation for a given color; and Q is a function that provides a shape value and its position within the matrix; and i and j are counters within the x dimension pixel matrix. This calculation may be used to merge the two separate binary strings into a single data block.

The data block is then based back through a decoding process at 160. This produces a reconstructed signal for the compressed media stream back at 111. Here, the original media signal associated with the media stream is compared against the compressed and then decompressed media stream identified as the reconstructed signal in FIG. 1.

A correction function is then generated at 112 to provide a mapping from the compressed media stream back to the original uncompressed version of the media stream. The correction function is a mathematical function that maps the decompressed version of the previously compressed version of the media stream back to the original media stream. In this manner, signal loss can be corrected in a novel manner not previously available in the industry.

The correction function is then appended to the compressed media stream or data block at 161. The compressed media stream and the correction function appended thereto are then ready for transport or streaming over a network connection for delivery to recipient. The recipient includes a decoding processing that decompresses the compressed media stream and then applies the correction function to substantially reproduce the original media stream.

The processing of FIG. 1 discusses an embodiment for performing a dual wavelet compression on a media stream and how that dual compression may be merged as a single binary string in a compressed data block. The processing 100 of FIG. 1 also provides an overview on how a decompressed media stream may be compared to the original uncompressed version of that media stream for purposes of producing a correction function. How the compression function is generated and subsequently consumed by a recipient's decompression will now be discussed in greater detail in the FIGS. that follow.

Figure 2:
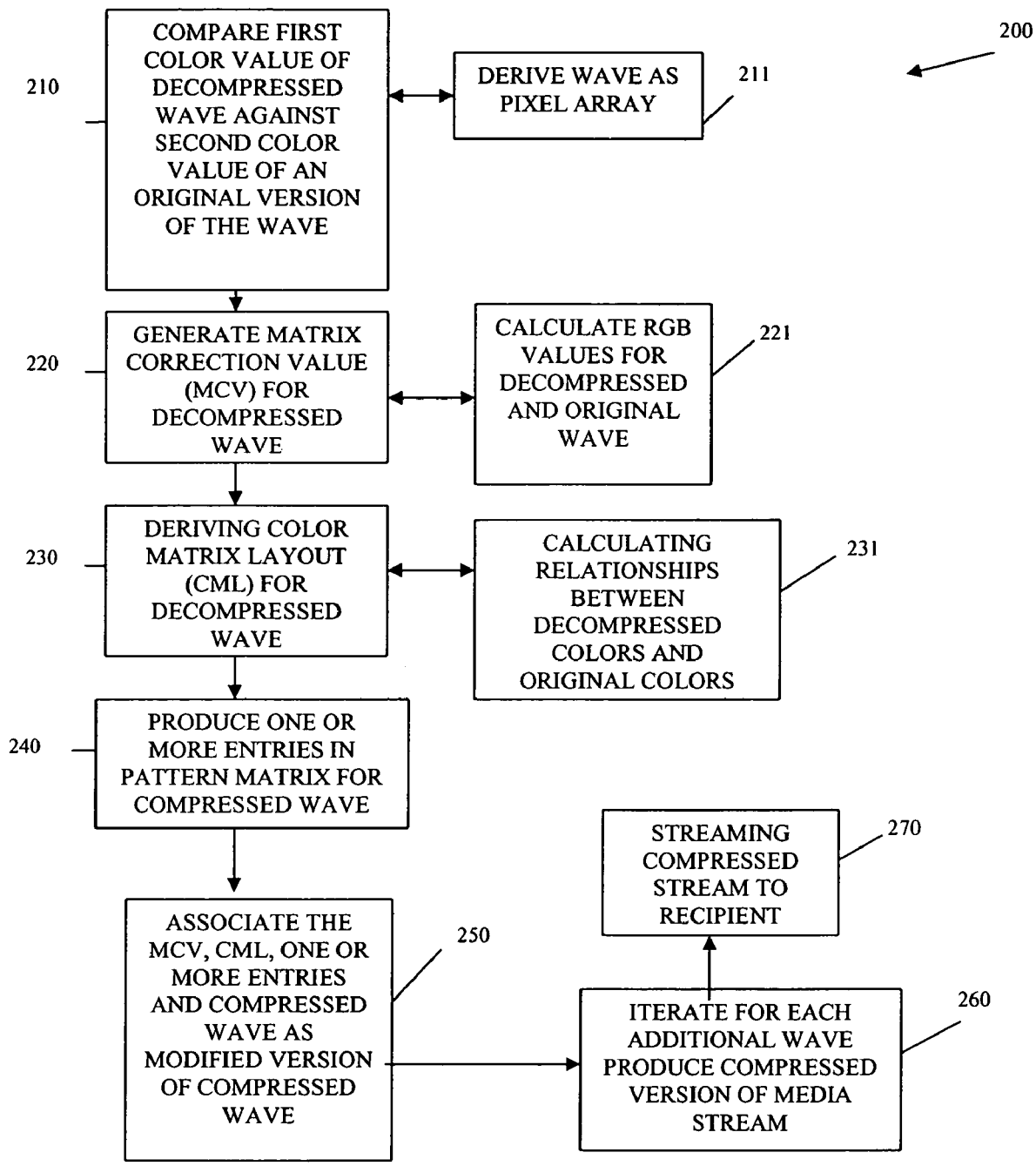
FIG. 2 is a diagram of method for compressing media data, according to an example embodiment.

FIG. 2 is a diagram of method 200 for compressing media data, according to an example embodiment. The method 200 (herein after "compression service") is implemented in a machine-accessible and readable medium and is accessible over a network. The network may be hardwire, wireless, or a combination or hardwired and wireless.

In an embodiment, the compression service represents the processing associated with generating the correction function depicted at 112 in FIG. 1, where a compressed media data is compared in uncompressed form against an original media stream which was not compressed.

The compression service compresses media data associated with a media stream and produces novel metadata that accompanies the compressed media data which permits a subsequent decompression service to restore that data to its original quality. This metadata may be viewed as the correction function discussed with respect to FIG. 1. In addition, the metadata permits a subsequent decompression service to predict or reconstruct portions of the media data that may not be present when the compressed media data is streamed to the decompression service. These novel features will now be discussed more fully and completely herein and below.

Initially, a media stream having media data is compressed. The initial compression can occur in any manner that substantially reduces the size of the media data. In an embodiment, the initial compression occurs by performing a dual wavelet compression on the media stream; one compression accounts for color features and another compression accounts for shape features. An example dual wavelet compression technique was discussed above with respect to FIG. 1. In some other embodiments, the initial compression is achieved via any binary compression technique where symbols in the media data are represented as bit strings within the initial compressed version of the media data. In another embodiment, any binary lossy compression technique is processed for initially compressing the original version of the media data.

The original version of the media data is temporarily retained for purposes of the subsequent modified compression, which is performed by the compression service depicted in FIG. 2. The initial compressed version is then temporarily decompressed and is compared against the original version of the media data in the manners described below.

The media data of the original version is segmented into waves; these waves are of predefined sizes. In an embodiment, each wave is represented as 8 by 8 (two dimensional) pixel matrix. Thus, a single wave may be viewed as an 8×8 (pixel matrix) segment of the media data. The term wave is used as opposed to blocks or frames because media streams, in particular video streams, exhibit image symbols which move or flow during the course of a video in manners that are similar to waves.

In some cases, these movements or waves exhibit patterns some of which may be unique and may repeat within the media stream. Thus, by logically viewing discreet portions of the media data as waves, characteristics of the media data can be more accurately captured, evaluated, and processed for compression and decompression purposes. Moreover, by viewing portions of the media data as waves future patterns or directions of particular waves can be more accurately predicted. This prediction can be particularly useful when a recipient of a compressed media stream has a connection temporarily interrupted during a streaming session and desires to continue playing the media stream for a viewer.

At 210, the compression service compares a first wave of the media data from the original version that has not been compressed and a second wave from a decompressed version of the media data that has been compressed. The purpose of this is to detect color quality loss that was introduced in the compressed version of the media data so that a correction can be supplied as a small number with the compressed version. That correction value can be later applied to a subsequent decompression of the compressed version of the media data for purposes of restoring the color quality back to what was present in the original version of the media data before it was compressed.

Continuing with 210, the compression service specifically compares a second color value of the second wave for the decompressed version of the media data that had been previously compressed against a first color value of the first wave for the original version that was not compressed. Again, in some embodiments, the waves are derived as predefined dimensions and sizes from the original version of the media data, and, at 211, one such technique for doing this is to derive the wave as a pixel array or matrix (e.g., 8×8 pixel matrix, etc.).

At 220, the compression service generates a matrix correction value (MCL) for the decompressed version of the media data that was previously compressed. This MCL represents a color value difference between the first color value of the first wave for the original version of the media data (hereinafter "original version") that was not compressed and the second color value of the second wave (hereinafter "decompressed wave") associated with the decompressed version of the media data that was previously compressed (hereinafter "decompressed version").

In an embodiment, at 221, the MCL for the decompressed wave is expressed as a number value that is obtained by calculating RGB color values from the decompressed version and the original version and expressing the difference between the two RGB color values as a ratio that provides the number value for the MCL. For example, the red, green, and blue (RGB) pixel values of the original version are summed or multiplied to acquire a value as $RGB^{org}$; next the RGB values of the decompressed version are summed or multiplied to acquire a value as $RGB^{dec}$. The MCL is then expressed as the ratio $$C^V = \frac{RGB^{org}}{RGB^{dec}},$$

where $C^V$ is the MCL number value. The $C^V$ can be applied by a subsequent decompression service or recipient of the media data when subsequently decompressing the compressed wave associated with this $C^V$ for purposes of restoring that decompressed wave to its original RGB color value.

In addition to color value loss that may occur with an initial compression version of the media data, the individual color patterns and relationships of individual colors within the original version's wave and the decompressed version's wave should be noted. That is, a MCL provides the overall color correction for the compressed wave as a whole (e.g., matrix) but does not provide information on how to distribute portions of that single color correction value within a subsequently decompressed wave.

Accordingly, at 230, a color matrix layout (CML) is derived from the original version's wave and the decompressed version's wave. The CML permits a subsequently decompressed version of the compressed wave to be restored to the color layout of the original version.

In an embodiment, at 231, the CML is calculated by determining the relationships and patterns between colors within the original version vis-à-vis the decompressed version. This may be achieved by creating a function defined as:

$$F(u,v) = \frac{1}{4}C_u C_v \sum_{x=0}^{7}\sum_{y=0}^{7} f(x,y)\cos\left(\frac{(2x+1)u\pi}{16}\right)\left(\frac{2y+1)v\pi}{16}\right);$$

where x and y are indices into an 8×8 pixel array of samples defined as a wave, and u and v are indices into an 8×8 matrix. Furthermore, $$C_u = \frac{1}{\sqrt{2}} \text{ for } u=0, C_u = 1;$$

$$\text{and } C_v = \frac{\pi}{\sqrt{2}} \text{ for } v=0, C_v = 1.$$

These results are summed to provide the CML.

In addition to corrections for color values within a wave and color layout relationships, the symbols within a wave may slightly move or not be in the proper location when compressed. Correspondingly, a pattern matrix is created for the entire media stream being compressed. The pattern matrix includes one or more entries per wave for the media data and these entries provide the positioning information for symbols within a particular wave. The positions represented by the entries in the pattern matrix define the positions of symbols as they appeared within their respective waves within the original version before it was compressed. In this manner, when a compressed wave is subsequently decompressed its mapped symbols can be restored to their original or substantially true positions within the wave through use of entries acquired for the proper positions from the pattern matrix.

Thus, at 240, the compression service produces one or more entries in the pattern matrix for the decompressed wave, where these entries identify symbols within the original version and their proper location within the original version.

The MCV, CML, and the entries into the pattern matrix represent novel metadata produced by the compression service for a compressed wave of media data. The MCV and CML can be appended as values with each compressed wave processed through the compression service. Since the MCV and CML are number values, their presence adds little overhead or size to the compressed media stream. The pattern matrix having the entries for each compressed wave of the compressed media stream accompanies the entire compressed media stream as a single data structure. The pattern matrix is streamed to a recipient before the compressed wave. The one or more entries within the pattern matrix do not have to accompany each compressed wave, since these can be acquired by indexing into the pattern matrix with a sequence number of a particular compressed wave.

Additionally, the pattern matrix can be consumed in novel manners by a recipient of a compressed media stream because the pattern matrix provides positioning information for symbols within their respective waves. Thus, the recipient that receives the pattern matrix may process the pattern matrix with a pattern matrix function for purposes of predicting future waves of compressed media data that may not have yet arrived. Portions of compressed media data may not arrive at the recipient's location for a variety of reasons, such as network failures, network loads, etc. Therefore, the pattern matrix and a pattern matrix function, which interprets the pattern matrix, are very useful features to recipients, because they can be used to continue playing a media stream even when failures or interruptions occur in a streaming session.

The pattern matrix function, which understands the format of the pattern matrix and how to process the entries, may also be streamed dynamically with a compressed media stream to a recipient. That is, the recipient does not have to have the pattern matrix function in advance of receiving a compressed media stream from the compression service. If the pattern matrix function is streamed with a compressed media stream to the recipient, then the function is sent first with the pattern matrix before any compressed waves are streamed to the recipient.

At 250, the MCV, CML, the one or more entries included in the pattern matrix, and the compressed wave being processed by the compression service are all associated with one another within the compressed wave to produce a modified compressed wave. At 260, the processing of 210-250 may be iterated for the entire media data or stream to produce a complete compressed version of the media stream having the metadata enhancements described herein. Next, at 270, the compressed media stream is streamed to a recipient.

The recipient may dynamically receive the pattern matrix function as an initial block of information during a streaming session between the compression service and the recipient. The pattern matrix function permits the recipient to decompress each compressed wave in the compressed media stream, acquire each wave's MCV, CML, and entry values and apply them in the decompressed version of the compressed wave.

One now fully appreciates how a more robust compression technique can be performed against media data for purposes of substantially reducing the size of the media data by using lossy binary compression techniques. However, unlike lossy compression, color quality, layout, and positioning information is not lost when the compressed media data is subsequently decompressed because of the novel metadata that accompanies the compressed media data (e.g., MCV, CML, entries into pattern matrix, and pattern matrix). The novel metadata not only retains quality and prevents data loss, but it also provides a novel mechanism via the pattern matrix to predict and reconstruct portions of the compressed media data that may be lost or delayed for some reason during a media streaming session. Additionally, because decompression is simply the inverse of compression. The techniques presented herein also provide novel decompression for media data.

Figure 3:
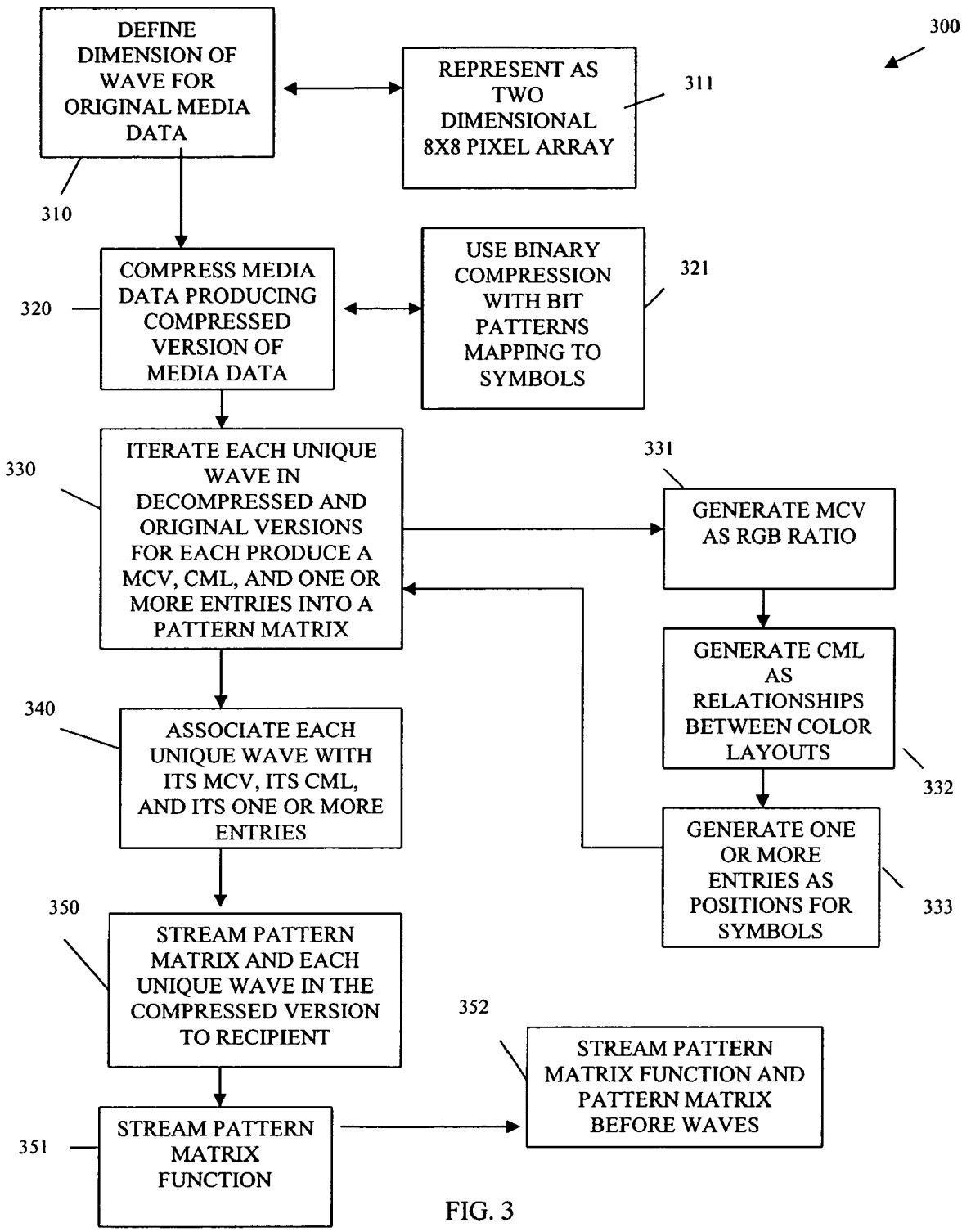
FIG. 3 is a diagram of another method for compressing media data, according to an example embodiment.

FIG. 3 is another method 300 for compressing media data, according to an example embodiment. The method 300 (hereinafter "alternative compression service") is implemented in a machine-accessible and readable medium and is accessible over a network. The network may be hardwired, wireless, or a combination of hardwired and wireless. The alternative compression service presents an alternative perspective to the method 200 of FIG. 2. In an embodiment, the alternative compression service may be viewed as the processing used to generate the correction function depicted at 112 of FIG. 1.

Initially, the alternative compression service acquires media data that is to be compressed. At 310, units of that media data are defined where a unit is referred to as a wave. The dimensions of the wave can be preconfigured within the alternative compression service or may be provided as runtime parameters to the processing. In an embodiment, at 311, the dimension of the wave is defined as a two-dimensional pixel array of size 8 pixels by 8 pixels.

At 320, the original media data that was not compressed (original version) is compressed (compressed version). In an embodiment, the compression is performed using a dual wavelet compression technique, such as the one discussed above with respect to the processing 100 of FIG. 1. However, any binary compression technique may be used for purposes of acquiring a substantial reduction in the size of the media data as it is represented in the compressed version. In an embodiment, at 321, a binary lossy compression technique is used where unique bit patterns within the compressed version map on decompression to unique symbols.

At 330, the compressed version is then decompressed (decompressed version), and the decompressed version is iterated for each unique wave appearing in the original version and the decompressed version. During a single iteration a MCV, a CML, and one or more entries into a pattern matrix are produced for each unique wave of the decompressed version. This information represents novel metadata for each decompressed wave of the media data.

In an embodiment, at 331, the MCV is generated as an RGB ratio between the original version's wave and the decompressed version's wave. A technique for doing this was described above with respect to the method 200 of FIG. 2. The MCV represents a color correction to the decompressed version's wave because during compression some color information may have been lost in an effort to reduce the size of the media data to acceptable levels.

In another embodiment, at 332, the CML is generated as the relationships or patterns between individual colors within the original version's wave and the decompressed version's wave. Again, a technique for acquiring the CML for a given wave was presented above with respect to the method 200 of FIG. 2.

In still further embodiments, at 333, the one or more entries are generated as positions for symbols that appear in the original version's wave. An explanation of these entries and the pattern matrix in which they reside was also discussed in detail above with respect to the method 200 of FIG. 2.

At 340, each unique wave of the compressed version is associated with its MCV, its CML, and its one or more entries into the pattern matrix. This metadata was derived by comparing the original version and the decompressed version and maps to a specific wave included within the compressed version.

At this point, the compressed media data is ready to be streamed to a recipient for subsequent decompression and play. Accordingly, at 350, the pattern matrix and each unique compressed wave along with its novel metadata are streamed to a recipient. In an embodiment, at 351, a pattern matrix function that interprets and processes the pattern matrix and/or the MCV and the CML are also streamed to the recipient, assuming the recipient does not have or does not retain an instance of the pattern matrix function. At 352, the pattern matrix and the pattern matrix function are streamed to the recipient before the compressed waves are streamed to the recipient.

In some embodiments, the recipient may use the pattern matrix function and the pattern matrix to recreate and to predict further or as yet not received compressed waves. The pattern matrix provides the flow of the symbols occurring within the compressed waves, such that the pattern matrix function can detect these patterns, identify them, and recreate or predict what further or as yet not received waves should be. In addition, each compressed wave received by the recipient includes its MCV, its CML, and its one or more entries into the pattern matrix. This information permits the recipient to correct and restore the proper color values, color layouts, and symbol positioning within decompressed waves, such that these modified decompressed wave exhibit the same quality of the original version before it was compressed.

Figure 4:
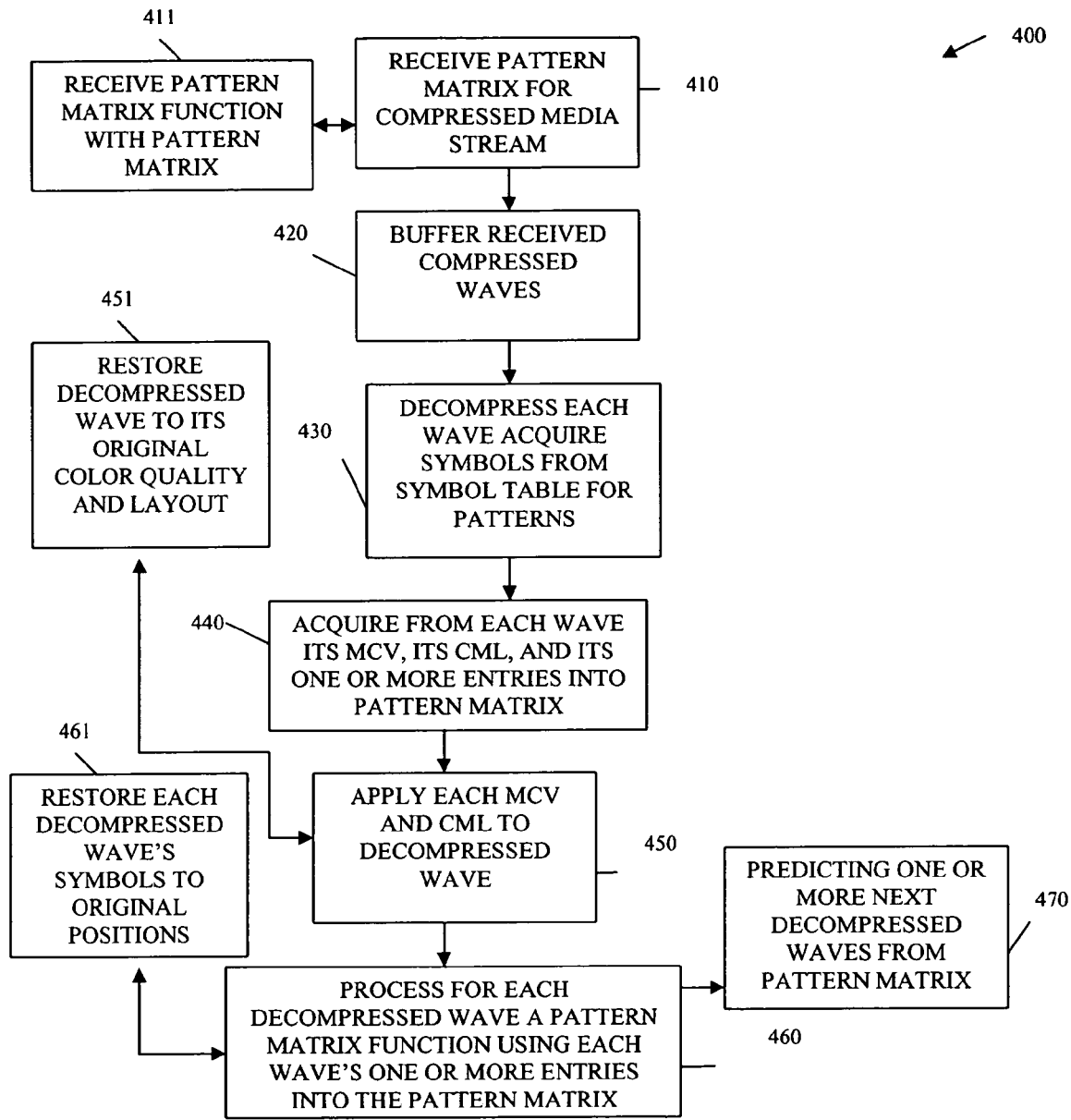
FIG. 4 is a diagram of a method for decompressing media data that was compressed by the methods of FIG. 1 or FIG. 2, according to an example embodiment.

FIG. 4 is a diagram of a method 400 for decompressing media data, according to an example embodiment. The method 400 (hereinafter "decompression service") is implemented in a machine-accessible and readable medium and is accessible over a network. The network may be hardwired, wireless, or a combination of hardwired and wireless. The decompression service represents processing that may occur on a recipient's site that receives media data compressed in the manners described above with respect to the processing 100 and the methods 200 and 300 of FIGS. 1-3.

The decompression service determines that it is receiving or being requested to receive a compressed media stream. The compressed media stream may be received directly from streaming services that use the compression techniques described above or the compressed media stream may reside in local storage where a media player or other local application requests that the compressed media stream be retrieved and decompressed for play. In any event, at 410, the decompression service receives initial a pattern matrix for a compressed media stream.

The pattern matrix was described above with respect to the methods 200 and 300 of FIGS. 2 and 3. Specifically, the pattern matrix includes symbol locations as they appeared in an original version of the media stream before it was compressed. The locations for symbols are defined on a wave basis, meaning that each wave within the compressed media stream includes one or more entries for its decompressed symbols and those entries provide accurate positioning information of those decompressed symbols for that wave.

In an embodiment, at 411, the decompression service may also receive a pattern matrix function. The pattern matrix function assists in interpreting and processing the pattern matrix and may assist in augmenting the decompressed media stream with MCV and CML values for each decompressed wave. In an alternative embodiment, the pattern matrix function is already available or resident within the processing environment of the decompression service, such that its receipt or acquisition is not necessary.

At 420, the decompression service buffers the compressed waves that are being received at 410. At 430, each wave is decompressed for purposes of mapping bit patterns in the compressed version of each wave to symbols within a symbol table in order to fully develop scenes or patterns for each decompressed wave.

As each wave is decompressed, at 430, each wave will have other metadata represented as number values for a MCV and a CML. Additionally, each wave has a unique sequence number in the compressed media stream such that each wave's one or more entries into the pattern matrix may be acquired. Accordingly, at 440, each wave's MCV, CML, and one or more entries into the pattern matrix are acquired from each compressed wave.

At 450, each decompressed wave's MCV and CML are applied. This results, at 451, in restoring the decompressed wave's color values and color layouts back to their original color quality and color layout as they appeared in the original media data before it was compressed.

At 460, the decompression service enlists the services of a pattern matrix function to process each decompressed wave's one or more entries into the pattern matrix. The result, at 461, is that the decompressed wave's symbols are restored back to their original location within the decompressed wave as they appeared in the original media data before it was ever compressed.

In some embodiments, at 470, the pattern matrix function may also assist the decompression service in predicting one or more next or future decompressed waves from the pattern matrix. That is, the pattern matrix provides a mechanism by which non received or non processed waves can be reconstructed when it is necessary or desirable to do so.

Figure 5:
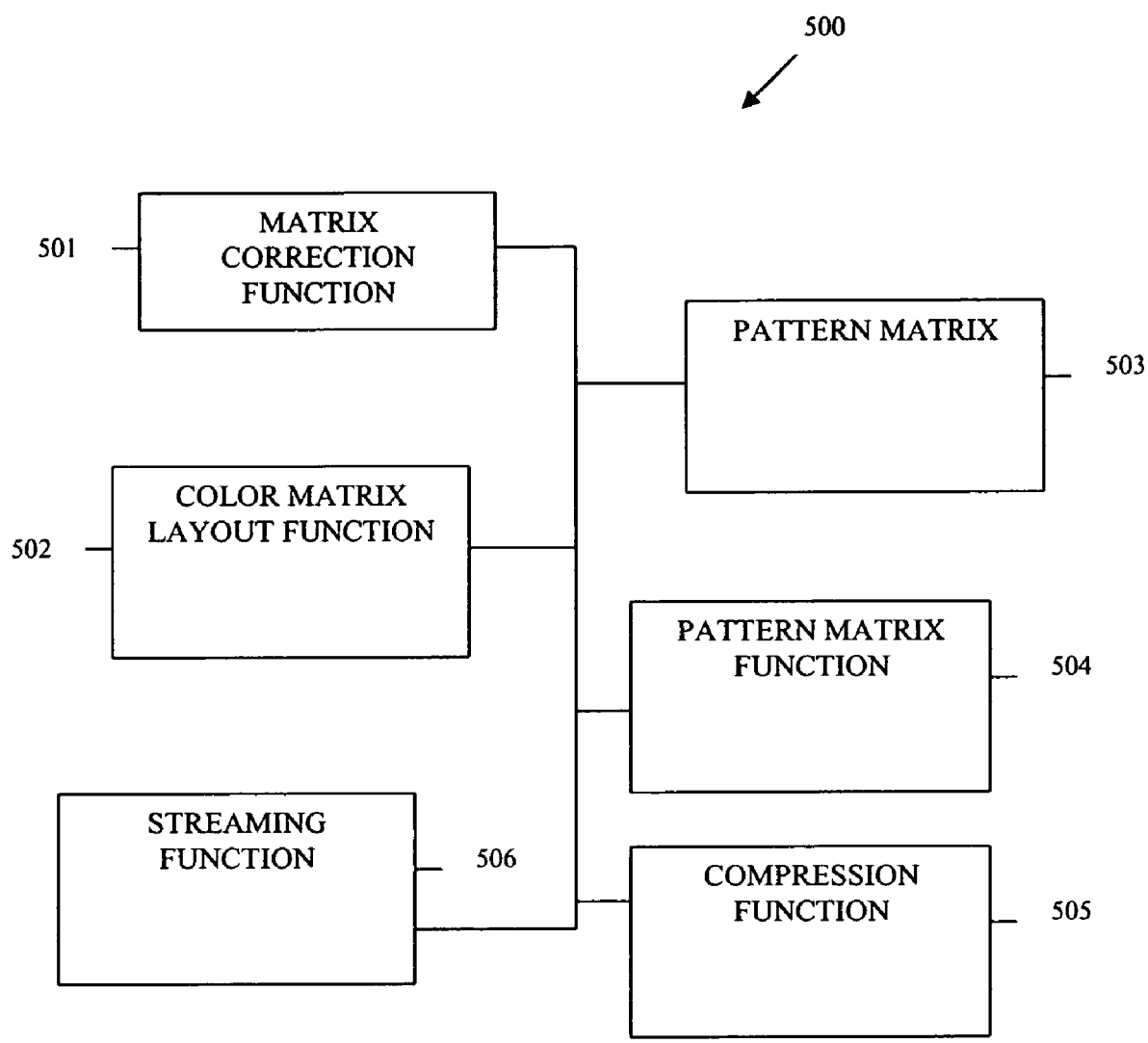
FIG. 5 is a diagram media data compression system, according to an example embodiment.

FIG. 5 is a diagram of a media data compression system 500, according to an example embodiment. The media data compression system 500 is implemented in a machine-accessible and readable medium and is accessible over a network. The network may be hardwired, wireless, or a combination of hardwired and wireless. The media data compression system 500 implements, among other things, the processing 100 and the methods 200 and 300 of FIGS. 1-3 and produces compressed media data that is subsequently consumed by the method 400 of FIG. 4.

The media data compression system 500 includes a matrix correction function (MCF) 501, a color matrix layout function (CMLF) 502, and a pattern matrix 503. In some embodiments, the media data compression system 500 also includes a pattern matrix function (PMF) 504, a compression function 505, and/or a streaming function 505.

The MCF 501 is adapted to produce a MCV for a decompressed version of a previously compressed wave of media data vis-à-vis an original version of that wave before it was compressed. In an embodiment, the MCF 501 produces the MCV for a given decompressed wave by acquiring a RGB value for the decompressed wave and a second RGB for the corresponding original wave. The two RGB values are then expressed as a ratio where the second RGB value is divided by the first RGB value to provide the MCV. The MCV for each decompressed wave is associated with its corresponding compressed wave within the compressed media data or stream.

The CMLF 502 is adapted to produce a CML for a decompressed version of a previously compressed wave of media data vis-à-vis an original version of that wave before it was compressed. In an embodiment, the CMLF 502 produces the CML for a given decompressed wave by summing color patterns or relationships included within the decompressed wave and the original wave. An example calculation for achieving this was presented above with respect to the method 200 of FIG. 2. The CML for each decompressed wave is associated with its corresponding compressed wave within the compressed media data or stream.

The pattern matrix 503 is adapted to house positioning information for symbols within given waves as they appeared in an original version of the media data before it was compressed. The one or more entries do not have to be directly housed within the compressed media data because each compressed wave will include a unique sequence number that can be used as an index value into the pattern matrix 503. The one or more entries permit the symbols in each decompressed wave to be restored to their originally noted or intended positions within the decompressed wave.

In an embodiment, the media data compression system 500 also includes a PMF 505. The PMF 505 permits the interpretation and processing of the entries and information included within the pattern matrix 503. In some cases, the PMF may be provided with a compressed media stream and an initial block of information. In this manner, a recipient of the compressed media data produced by the media data compression system 500 need not have advance capabilities to decompress and process the compressed media stream, since the PMF can be used for these purposes. Thus, in some cases the PMF may also assist in applying the MCV and CML values to a subsequent decompression service.

In an embodiment, the media data compression system 500 also includes a compression function 505. That compression function 505 may be a binary lossy compression algorithm or any other desired compression function 505 that achieves a desired level of data compression from the original media data and that substantially reduces the size of the compressed media data vis-à-vis the original media data.

In still another embodiment, the media data compression system 500 may also be equipped with a streaming function 506. The streaming function 506 is adapted to stream the pattern matrix 503 and the compressed waves that are augmented with MCV and CML values produced by the MCF 501 and the CMLF 502, respectively. The compressed waves are streamed to recipients. In an embodiment, the recipient is the decompression service represented by the method 400 of FIG. 4.

It has now been demonstrated how lossy compression or other data loss compression techniques may be augmented with metadata and processing for purposes of retaining quality associated with original media data before it was compressed. These techniques, methods, and systems address the growing needs of consumers that desire quick delivery and view of media data without a loss in quality. It has also been demonstrated how a novel dual wavelet compression may be performed on media streams.

The above presented example is but one usage scenario that may be implemented with the teachings presented herein. It is presented for purposes of illustration only and is not intended to limit any aspect of the embodiments presented herein.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   comparing a first color value of a decompressed version of a compressed wave of media data against a second color value for an original version of the media data;
   generating a matrix correction value representing the difference between the second color value and the first color value;
   deriving a color matrix layout for the decompressed version based on color layouts for the decompressed version and the original version of the media data; and
   producing one or more entries in a pattern matrix for use with a pattern matrix function, wherein the one or more entries represent movement corrections to be applied to symbols in the compressed wave by the pattern matrix function when the compressed wave is subsequently decompressed.

2. The method of claim 1 further comprising, iterating the method for each additional compressed wave of a media stream producing a compressed version of the media stream.

3. The method of claim 2 further comprising, streaming the compressed version to a recipient.

4. The method of claim 1, wherein comparing further includes deriving the compressed wave as a pixel array having a predefined dimension from the original version of media data.

5. The method of claim 1, wherein deriving further includes calculating relationships between the decompressed version's colors vis-à-vis the original version's colors to derive the color matrix layout.

6. The method of claim 1, wherein generating further includes calculating red, green, and blue values for the decompressed version and the original version and producing the matrix correction value as a ratio between the two sets of values.

7. The method of claim 1 further comprising, associating the matrix correction value, the color matrix layout, the one or more entries, and the compressed wave with one another within a modified version of the compressed wave.

8. A method, comprising:
   defining a dimension for a wave within an original version of media data;
   compressing the media data producing a compressed version of the media data;
   iterating each unique wave of the original version and a corresponding decompressed version derived from the compressed version producing for each compressed wave a matrix correction value, a color matrix layout, and one or more entries in a pattern matrix;
   associating each unique wave in the compressed version with its matrix correction value, its color matrix layout, and its one or more entries; and
   streaming the pattern matrix and each unique wave in the compressed version to a recipient.

9. The method of claim 8, wherein defining further includes representing the dimension as a two-dimensional matrix of pixels that are 8 pixels by 8 pixels.

10. The method of claim 8, wherein compressing further includes using a binary compression algorithm to perform the compression, wherein symbols within the original version of the media data are represented as unique binary string patterns within the compressed version.

11. The method of claim 8, wherein iterating further includes:
   generating each matrix correction value as a ratio of a first combined red, green, and blue color value for the original version by second combined red, green, and blue color value for the decompressed version;
   generating each color matrix layout as a summed value representing individual first colors relative to their original positions to one another within the original version with individual second colors relative to their original positions to one another within decompressed version; and
   generating the one or more entries as positions for symbols within their respective waves as originally noted within the original version.

12. The method of claim 8, wherein streaming further includes streaming a pattern matrix function to the recipient, wherein the pattern matrix function interprets the pattern matrix.

13. The method of claim 12, wherein streaming further includes streaming the pattern matrix function and the pattern matrix before streaming each of the unique waves of the compressed version.

14. The method, comprising:
receiving a pattern matrix for a compressed media data stream;
buffering received waves associated with the compressed media data stream;
decompressing each wave by acquiring and assembling symbols from a symbol table which are identified by patterns within each wave;
acquiring from each decompressed wave a matrix correction value, a color matrix layout, and one or more entries into the pattern matrix;
applying to each decompressed wave its matrix correction value and its color matrix layout; and
processing for each decompressed wave a pattern matrix function that uses the pattern matrix and each decompressed wave's one or more entries into the pattern matrix.

15. The method of claim 14 further comprising, predicting one or more next decompressed waves based on the pattern matrix.

16. The method of claim 14 further comprising, receiving the pattern matrix function with the pattern matrix.

17. The method of claim 14, wherein applying further includes restoring each decompressed wave to an original color quality and layout associated with its original version before it was compressed.

18. The method of claim 14, wherein processing further includes restoring each decompressed wave's symbols to their original locations as they appeared in an original version of each decompressed wave before it was compressed.

19. A method, comprising:
splitting a media stream into a color stream and a shape stream;
compressing the color stream;
compressing the shape stream; and
merging the compressed color stream and the compressed shape stream into a single compressed stream representing the original media stream.

20. The method of claim 19 further comprising:
performing hexadecimal encoding techniques on the color stream; and
performing hexadecimal encoding techniques on the shape stream.

21. The method of claim 20 further comprising:
performing binary entropy encoding on the color stream; and
performing binary entropy encoding on the shape stream.

22. A system, comprising:
a matrix correction function;
a color matrix layout function; and
a pattern matrix, wherein the matrix correction function is adapted to produce a matrix correction value for a decompressed version of a compressed wave of media data vis-à-vis an original version before it was compressed, the color matrix layout function is adapted to produce a color layout correction for the decompressed version of the compressed wave, and wherein the pattern matrix is adapted to house one or more entries for positions of symbols originally noted in the original version.

23. The system of claim 22 further comprising, a pattern matrix function that is adapted to process the one or more entries within the pattern matrix for the compressed wave when the compressed wave is subsequently decompressed.

24. The system of claim 22 further comprising, a compression function that is adapted to produce the compressed wave from the original version.

25. The system of claim 22, wherein compression function is a binary compression function that is adapted to produce bit patterns within the compressed wave, and wherein each bit pattern decompresses as a unique symbol.

26. The system of claim 22, wherein the pattern matrix is adapted to be used as a motion predictor for a future compressed wave.

27. The system of claim 22 further comprising, a streaming function adapted to stream the pattern matrix and the compressed wave along with its matrix correction value and its color matrix layout to a recipient.

\* \* \* \* \*